(12) United States Patent
Streblau et al.

(10) Patent No.: US 11,933,411 B2
(45) Date of Patent: Mar. 19, 2024

(54) LOOP FLUSHING SYSTEM FOR HYDRAULIC UNITS

(71) Applicant: Danfoss Power Solutions G.m.b.H & Co. OHG, Neumünster (DE)

(72) Inventors: Arne Streblau, Neumünster (DE); Martin Wüstefeld, Neumünster (DE)

(73) Assignee: DANFOSS POWER SOLUTIONS GMBH & CO. OHG, Neumunster (DE)

( * ) Notice: Subject to any disclaimer, the term of this patent is extended or adjusted under 35 U.S.C. 154(b) by 185 days.

(21) Appl. No.: 17/397,036

(22) Filed: Aug. 9, 2021

(65) Prior Publication Data

US 2022/0049778 A1 Feb. 17, 2022

(30) Foreign Application Priority Data

Aug. 14, 2020 (DE) .......................... 102020210394.1

(51) Int. Cl.
*F16K 11/07* (2006.01)
*F15B 1/26* (2006.01)
*F15B 15/20* (2006.01)

(52) U.S. Cl.
CPC ............ *F16K 11/0716* (2013.01); *F15B 1/26* (2013.01); *F15B 15/20* (2013.01)

(58) Field of Classification Search
CPC ... F16K 3/246; F16K 3/24; F16K 3/32; F16K 3/34; F16K 21/02; F16K 31/363; F15B 15/20; F15B 2211/20561; F15B 2211/27; F15B 2211/41563; F15B 2211/41581; F15B 2211/428; F15B 2211/50518; F15B 2211/5157; F15B 2211/5159; F15B 2211/528
See application file for complete search history.

(56) References Cited

U.S. PATENT DOCUMENTS

| | | | |
|---|---|---|---|
| 2006/0064974 A1 | 3/2006 | Whitaker et al. | |
| 2016/0153556 A1* | 6/2016 | Kenkel | F16K 11/07 137/1 |
| 2017/0023032 A1* | 1/2017 | Streblau | F15B 21/045 |
| 2018/0245700 A1* | 8/2018 | Okamura | F16K 31/363 |

* cited by examiner

*Primary Examiner* — Kelsey E Cary
(74) *Attorney, Agent, or Firm* — McCormick, Paulding & Huber PLLC

(57) ABSTRACT

Hydraulic fluid flushing valve for hydrostatic units usable in closed hydraulic circuit propel applications, having a flushing valve housing with a first inlet port connected to a first working line, a second inlet port connected to a second working line, and a discharge port for draining hydraulic fluid. A two-sided flushing valve flushing valve spool which can be shifted is mounted within the flushing valve housing in a cylindrical valve bore, which, in a shifted position, enables a fluid flow from one of the first or the second inlet port at which the lower hydraulic pressure is present, to the discharge port. The flushing valve spool includes on each side a pressure surface each of which is connected to one of the two inlet ports. At each side of the flushing valve spool a flushing valve spring is located in the flushing valve housing in such a manner that, when the flushing valve spool is in its centre, non-shifted position, at each side of the flushing valve spool a distance between a spring contact surface on the flushing valve spool and a spring support surface in the flushing valve housing is greater than the axial length of the corresponding flushing valve spring.

20 Claims, 6 Drawing Sheets

LOOP FLUSHING SYSTEM FOR HYDRAULIC UNITS

CROSS-REFERENCE TO RELATED APPLICATION

This application claims foreign priority benefits under 35 U.S.C. § 119 to German Patent Application No. 102020210394.1 filed on Aug. 14, 2020, the content of which is hereby incorporated by reference in its entirety.

TECHNICAL FIELD

The present invention relates to a hydraulic fluid flushing valve for hydrostatic units usable in closed hydraulic circuits. The present invention also relates to hydrostatic units using such a hydraulic fluid flushing valve and relates to hydraulic propel units equipped with such a hydraulic fluid flushing valve.

BACKGROUND

In hydraulic units connected to a closed hydraulic circuit for the hydraulic fluid, like e.g. hydrostatic drives or propel systems, in particular equipped with hydrostatic units like hydrostatic pumps and hydrostatic motors, the hydraulic fluid used for the generation of hydraulic forces and hydraulic performance suffers of elevated temperatures during operation of the hydrostatic unit(s). Additionally, during operation of hydraulic units, movable parts as e.g. bearings, shaft bearings, guiding shoes, etc. need to be lubricated for its proper function, as well as for being prevented from overheating. This lubrication and prevention of overheating is typically performed by a flushing system also called loop flushing system in order to flush a certain amount of oil, i.e. hydraulic fluid, from the low pressure side of a closed circuit system for cooling and/or regeneration purpose. Hence, an intended fluid leakage from the low pressure side of the hydrostatic apparatus to an area of the hydrostatic unit at even lower pressure, e.g. to a housing of the hydrostatic unit or to a tank, is created. This flushed hydraulic oil is missing in the closed circuit and has to be charged again to the closed circuit. Commonly, this is performed by a charge system inside the hydrostatic unit charging/pumping fresh and "cold" hydraulic fluid from the housing/tank back into the closed hydraulic circuit at the low pressure side.

However, during a start-up of a hydrostatic unit in, for example, a cold environment, the hydraulic fluid/oil circuit needs to be warmed up before normal driving behaviour of the hydrostatic unit is possible. In this start-up phase, in which the hydrostatic pump of a closed circuit typically idles, i.e. not producing a significant level of pressure, the hydrostatic pump is warming up on its own, because it contains, e.g., a charge relief valve which is producing some heat due to the pressure loss caused by the flow of the charge pump. This flow, generated by the charge pump, is heating up the pump housing, however, not the rest of the closed hydraulic circuit. As long as the hydrostatic pump is in its neutral position, the hydraulic fluid in the system's hoses and the hydrostatic motor or motors are not heated up and, therefore, the system's hoses and propel applications remain cold.

In this situation, it would be advantageous to have a small flow of hydraulic fluid circulating through the whole closed hydraulic circuit, in order for the circuit and its components to be warmed up as well, not only the hydrostatic pump.

On the other hand, the highest fluid temperatures in closed hydrostatic circuits usually occurs at the hydraulic driving mechanism, like a rotational kit of a hydrostatic motor. After transforming hydraulic energy into mechanical energy, the hydraulic motor is still at elevated temperatures and eventually needs cooling, even though the hydraulic motor, respectively its rotational kit, is in neutral position. Here also, it would be advantageous to have a small amount of hydraulic fluid flow circling through the hydraulic circuit, which can be regenerated and/or cooled, respectively.

SUMMARY

Hence, it is an object of the present invention to provide such a low amount of hydraulic fluid flow during warm-up and/or cooling phase of the hydraulic unit in a closed circuit. Further, the inventive system should be simple and, at the same time, cost effective and robust. Moreover, the inventive system should be applicable in already existing hydrostatic units.

The object is solved by the invention in providing a hydraulic fluid flushing valve for hydrostatic units, which can be used in closed hydraulic circuits. The inventive hydraulic fluid flushing valve has a flushing valve housing with a first inlet port connected to a first working line and a second inlet port connected to a second working line, and a discharge port for draining/discharging hydraulic fluid. A two-sided flushing valve spool which can be shifted is mounted within the flushing valve housing in a cylindrical bore. The flushing valve shuttle spool enables in a shifted position a fluid flow from that inlet port to the discharge port, which is at lower hydraulic pressure, wherein the flushing valve spool comprises on each side a pressure surface. Each of the pressure surfaces is connected to one of the two inlet ports. At each side of the flushing valve spool a flushing valve spring is located in the flushing valve housing, in such a manner that, when the flushing valve spool is in its centre, i.e. in the non-shifted position, a distance between a spring contacting surface on the flushing valve spool and a spring support surface in the flushing valve housing at each side of the flushing valve spool is greater than the axial length of the corresponding flushing valve spring.

In other words, the flushing valve flushing valve spool is accommodated according to the invention in the valve bore in a floating manner, when being in the centre position. In this centre position the flushing valve spool is free of spring forces as no physical contact between the valve spool and the valve springs exists, i.e. a gap is present between the flushing valve spool and the valve spring and/or the valve spring and its support surface in the valve housing. Hence, small pressure differences are sufficient to shift the flushing valve spool out of its centred position. In a shifted position, the flushing valve spool enables a fluid flow from the one inlet port, at which the lower hydraulic pressure is present towards the discharge port.

In another preferred embodiment only the flushing valve spool is floating and the flushing valve springs are fixed in the cylindrical flushing valve bore and are prevented from floating. Here, the flushing valve springs can be fixed at one end to end caps which, for instance, can be screwed in the cylindrical bore of flushing valve housing to close the cylindrical bore at both ends. In this embodiment a gap between the springs and the ends of flushing valve spool is present in the centred position of the flushing valve spool. Further, the flushing valve springs can be inserted in such an implementation in a prestressed/preloaded manner, when the other (inner) ends of the flushing valve springs abut against a shoulder in the cylindrical bore. By inserting the flushing valve spring in a prestressed manner a threshold value for permitting a greater flushing flow during operation of the hydraulic unit can be set, e.g.

Hence, in all embodiments the flushing valve spool can float during idling of the hydraulic unit, when no or nearly no working pressure is generated in the closed hydraulic circuit, in the range of the gap provided between each side of the flushing valve spool and the flushing valve spring and/or the its support face at the corresponding end of the cylindrical flushing valve bore. In this floating range the flushing valve spool can move without counterforce as the flushing valve springs are not compressed. So, when the flushing valve spool moves in this range it is preferred according to the invention that small amounts of hydraulic fluid flow are enabled, in order to enable heating of the closed circuit, when starting the working operation of a closed circuit, or enabling cooling of hydraulic fluid during operational breaks.

Here the invention enables hydraulic fluid flow from that inlet port which is at lower pressure to the discharge port of the flushing valve. However, in practise, a hydraulic unit at zero displacement does not occur and the hydraulic unit is always slightly out of its centred position and it depends on a multitude of parameters to determine at which of the two inlet ports of the flushing valve the higher or lower pressure is present. For this floating of the flushing valve spool in both directions is provided such that even very little differences in pressure at the inlet ports provoke the movement of the flushing valve spool out of its (theoretical) centred position.

Thus, according to the invention, a possibility for a hydraulic fluid flow via the inventive hydraulic fluid flushing valve is already possible at very low pressure deltas. However, since a hydraulic unit in a closed circuit system is almost never in the neutral position there will be always a very little delta pressure acting on the front faces of the flushing valve spool and shifting the flushing valve spool out of the centred position. Thereby, by means of the gaps between the flushing valve spool and its respective flushing valve springs, it is ensured that hydraulic fluid flushing can take place only from the low pressure side, as a shifted flushing valve spool disables hydraulic fluid flow from the inlet port with the higher pressure.

In sense of the invention, the gaps present when the flushing valve spool is in its centred position can be either between the respective spring and the flushing valve spool or between the valve spring and its support surface at the respective end of the cylindrical bore in the flushing valve housing or at both locations, as according to the invention, the valve springs can be arranged also in a floating manner in the cylindrical bore of the flushing valve, as their axial length is shorter than the distance of their spool contact surfaces on the spool and to the support surface at the end of the cylindrical bore in the flushing valve housing.

In one general embodiment, the flushing valve springs as well as the flushing valve spool are housed in the shuttle valve bore in a floating manner, however, in a more specific embodiment the valve springs can be fixed at their ends remote from the flushing valve spool in the valve bore in order to prevent them from floating. Essential for the invention is only a movability of the flushing valve spool free of spring forces within a small range. After having shifted this small range, the gaps are closed and further shifting of the flushing valve spool compresses the respective flushing valve spring. By providing this floatability at very low hydraulic forces, preferably low hydraulic fluid flow is enabled in the warming-up phase as well in the cooling-off phase of a hydraulic closed circuit, respectively, in a very simple and robust as well as cost effective manner. In operation, i.e. at operational pressure or working pressure in the hoses, hydraulic fluid flushing at the pump and the motor is still possible, however, in this situation, the flushing valve spool is pressed by hydraulic fluid under high pressure against one of the flushing valve springs and compresses the same. Thereby proportional to the high pressure acting on the correspondent pressure surface on the flushing valve spool, a variable hydraulic fluid flow is enabled. In these conditions, the inventive hydraulic fluid flushing valve works as commonly known hydraulic fluid flushing valves.

In another preferred embodiment, the flushing valve spool shows a general cylindrical shape, wherein, e.g., a mid-portion of the flushing valve spool shows a reduced diameter, which is connected fluidly to the discharge port and overlaps at least in a shifted position with one of the two inlet ports. This generally cylindrically formed flushing valve spool is further accommodated in a cylindrical valve bore in the flushing valve housing, in which, in a further embodiment, the cylindrical valve bore is closed by endcaps. Here, the spaces between the flushing valve spool ends and the endcaps form pressure chambers, each of which can be supplied with hydraulic fluid under pressure supplied by one of the two inlet ports connected thereto. Within these two pressure chambers, the flushing valve springs can also be accommodated in the inventive manner, i.e. in that a distance between a spring contacting surface on the flushing valve spool and a spring support surface, for instance at the endcap, is greater than the axial length of the flushing valve spring. With this, it is ensured that a gap between the spring and the spool or between the spring and the endcap is present, which enables the spool to perform a floating movement within the valve bore free of spring forces.

In another embodiment, the valve springs can be fixed to the endcaps, wherein the endcaps may be screwable into the cylindrical valve bore, so that a gap between the inner end of the spring and the flushing valve spool contact surface is existent, when the flushing valve spool is in its centred position. In a further embodiment, this gap is adjustable by screwing-in the endcaps, e.g., in a variable depth into the cylindrical valve bore.

According to the invention, the flushing valve spool of the hydraulic flushing valve is free of spring forces in its centred position and can already be shifted out of this centred position by very small pressure differences on its both pressure surfaces. When the pressure difference on the two pressure surfaces is zero, i.e. no pressure difference is present, the flushing valve spool may show a positive or negative overlap with the two inlet ports. When a negative overlap in the centred position of the flushing valve spool is provided, hydraulic fluid flushing from both working lines can be performed at the same time. On the other hand, if positive overlap of the flushing valve spool in its centred position with the two inlet ports is present, no flushing of hydraulic fluid can be performed. However, for both possibilities, i.e. the negative and positive overlap, hydraulic fluid flushing from the low pressure side via the draining or discharge port to the hydraulic unit casing or to a tank is enabled in the moment of a low or even very low pressure difference over the two sides of the flushing valve spool, as the flushing valve spool will be shifted out of its centred position.

BRIEF DESCRIPTION OF THE DRAWINGS

By help of the annexed Figures, the disclosed above and other features will become more apparent. Thereby, the invention is not limited to the embodiments shown in the Figures. It is to be understood that the features shown in different embodiments can be combined and are not limited to the embodiment for which they are shown. Further, modifications within the scope of the knowledge of a person skilled in the art are covered by the inventive idea as well. It is shown in.

DETAILED DESCRIPTION

Figure 1:
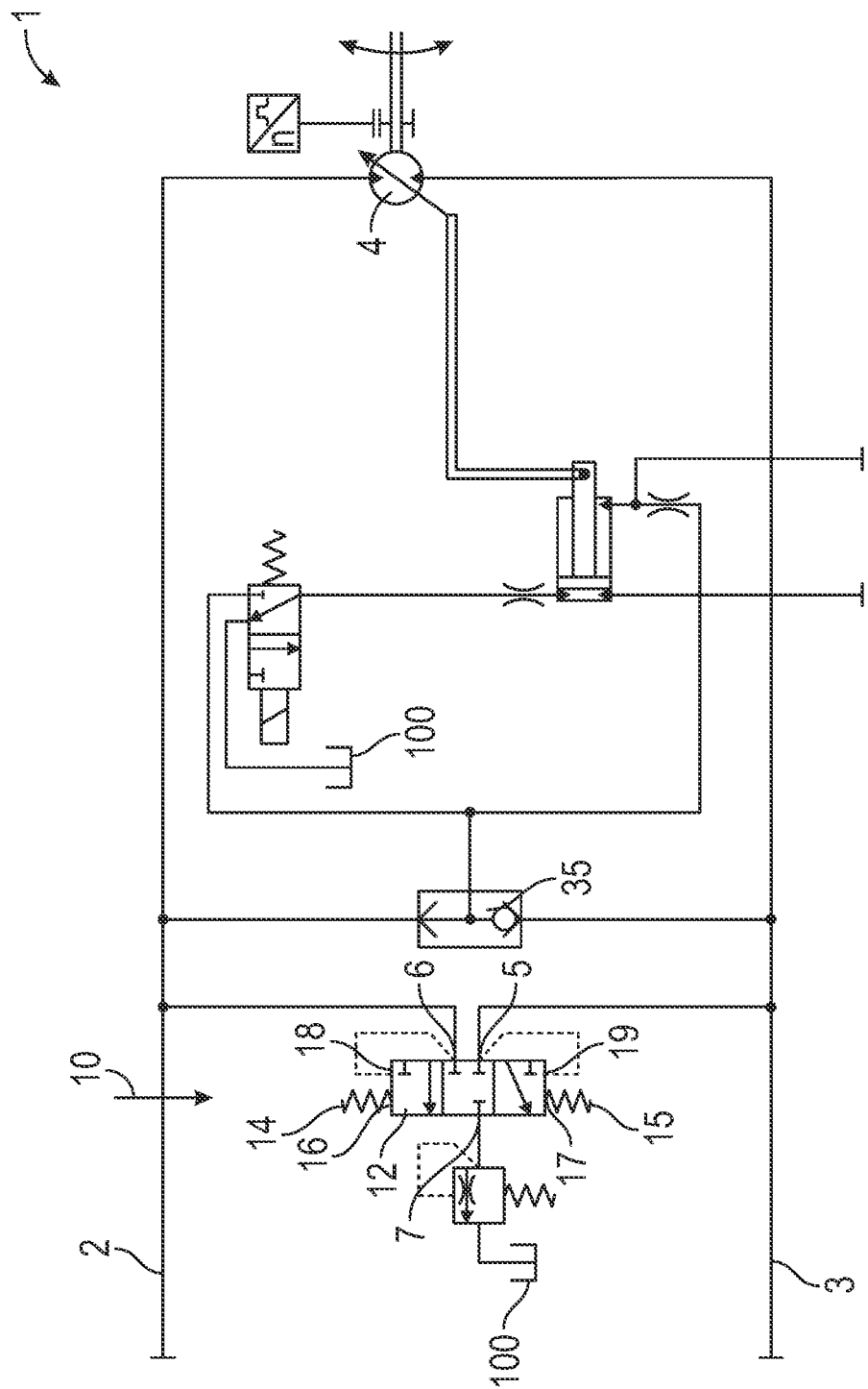
FIG. 1 schematically a hydrostatic unit with a hydraulic fluid flushing valve according to the state of the Art.

FIG. 1 shows a hydrostatic unit comprising a flushing valve 10 according to the state of the Art. An inlet port 5 of flushing valve 10 is connected to working line 3. An inlet port 6 of flushing valve 10 is connected to working line 2 and discharge port 7 is connected to tank 100. Supposing that working line 2 is the high pressure line, as indicated by high pressure selection valve 35, flushing valve spool 12 will be shifted against spring forces of second flushing valve spring 15 downwards as high pressure is present at inlet port 6 and acts on pressure surface 18. Thereby, flushing valve spool 12 enables, in the shifted position, fluid flow from inlet port 5 to discharge port 7, thereby, enabling hydraulic fluid flushing to tank 100. In this embodiment, according to the state of the Art as shown in FIG. 1, the high pressure acting on pressure surface 18 moves the flushing valve spool 12 against the force of flushing valve spring 15, arranged on the low pressure side of the flushing valve 10. From this state of the Art embodiment, it can be seen, that hydraulic fluid flushing depends only on the spring forces of the flushing valve springs 14 and 15, hence, a pressure on one of the pressure surfaces 18 or 19, not sufficient to overcome one of the spring forces leaves the flushing valve spool 12 in his centred position and hydraulic fluid flushing is disabled.

Figure 2:
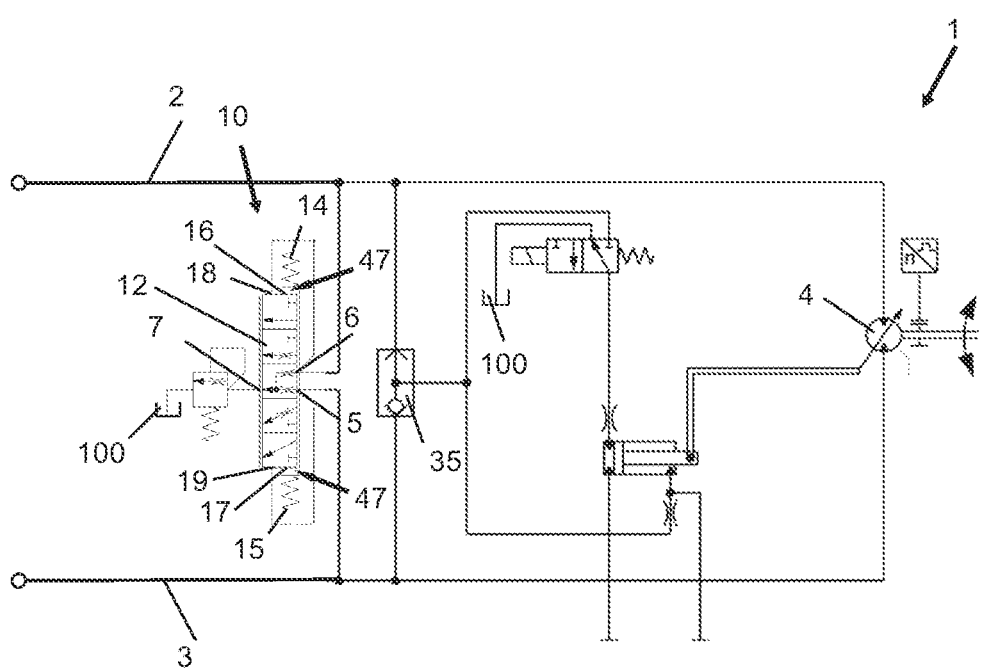
FIG. 2 schematically a hydrostatic unit equipped with a hydraulic fluid flushing valve according to the invention in a first embodiment.

FIG. 2 shows a first embodiment according to the invention for a hydraulic fluid flushing valve replacing the hydraulic fluid flushing valve according to the state of the Art shown in FIG. 1. The flushing valve spool 12 of the hydraulic fluid flushing valve 10 according to the invention is shown in its centred position showing on either side of the flushing valve spool 12 a gap 47 between the pressure surfaces 18 and 19 and the correspondent flushing valve springs 14 and 15. These gaps 47 between the spring contact surfaces 16 and 17 on the flushing valve spool 12 allow the flushing valve spool 12 to move outside its centred position free of spring forces, when the pressure at one of inlet port 5 or inlet port 6 is slightly higher than the corresponding other one, i.e. when the pressure difference is not equal to zero. Here, the most minimum difference between the pressures present at inlet port 5 or inlet port 6 is sufficient to move the flushing valve spool 12 in either direction. In FIG. 2, again, working line 2 is supposed to be the working line bearing the higher pressure. When shifting out of its centred position, the flushing valve spool 12, free of spring forces, slides towards one of the flushing valve springs 15 or 16, here, flushing valve spring 15, until it abuts against the same. Even though the pressure difference acting on pressure surfaces 18 and 19 is not high enough to compress flushing valve spring 15, fluid drainage from inlet port 5, here the low pressure inlet port, to discharge port 7 is enabled.

If the pressure in working line 2 rises, i.e. the pressure difference between the two inlet ports 5 and 6 rises, a higher pressure force is acting on pressure surface 18, and flushing valve spring 15 is compressed. When flushing valve spring 15 is compressed, a fluid flushing flow amount proportional to the pressure difference at inlet ports 5 and 6 can be discharged from discharge port 7 via inlet port 5. However, according to the invention, discharge of hydraulic fluid would have already been possible at pressure differences between the two working lines 2 and 3, which are, e.g., not capable to drive the rotational kit 4.

Figure 3:
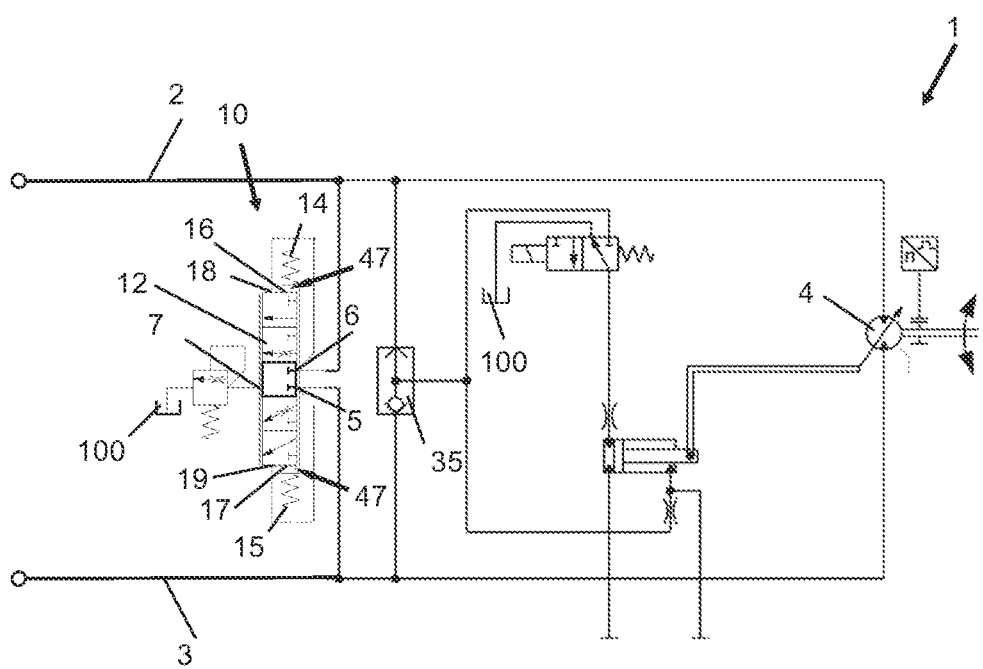
FIG. 3 schematically a hydrostatic unit equipped with a hydraulic fluid flushing valve according to the invention in a second embodiment.

In FIG. 3 another embodiment according to the invention is shown. This embodiment differs from the embodiment according to the one shown with FIG. 2 in that the flushing valve spool 12 in its centred position disables a fluid flushing from both inlet ports 5 or 6 to discharge port 7 as the flushing valve spool 12 has a positive overlap with the two inlet ports 5 and 6 when it is in its centred position. This situation may occur when the pressure forces acting on pressure surface 17 and pressure surface 18 are of equal height, so that the inventive flushing valve spool 12 is held in its centred position by hydraulic forces. At the moment when the pressure at one inlet port 5 or 6 is rising, the flushing valve spool 12 immediately shifts out of its centred position, closing the gap 47 and enabling a corresponding fluid flushing from the low pressure side to the discharge port 7.

Figure 4:
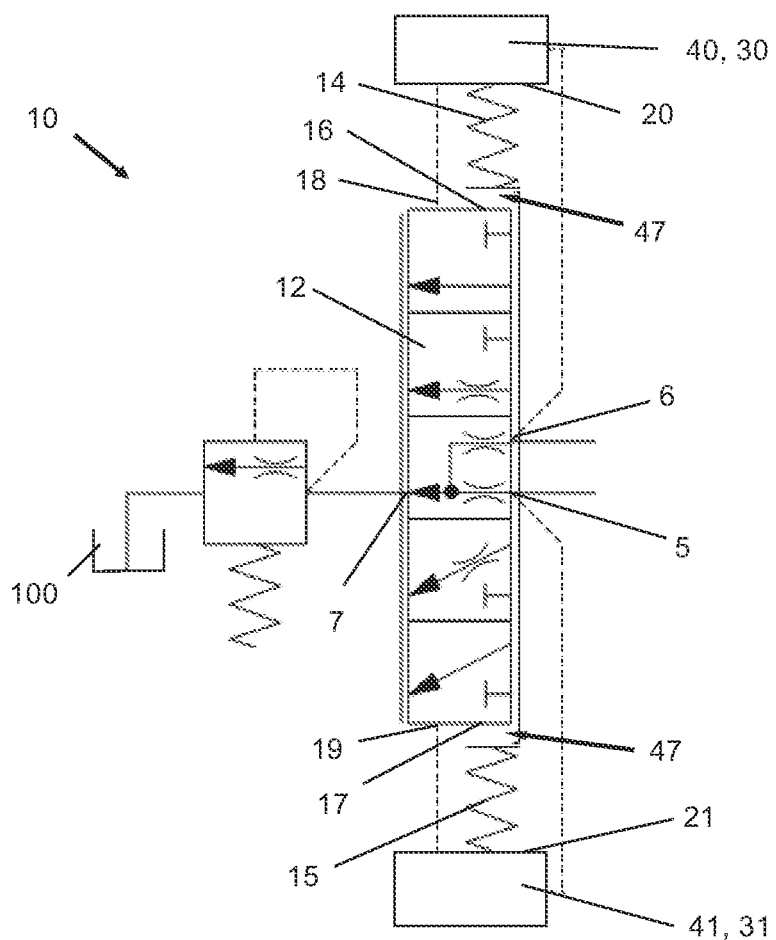
FIG. 4 schematically a detailed view of a flushing valve spool according the invention.

With FIG. 4, a flushing valve 10 is shown in an enlarged view. Contrary to the flushing valve spool 12 according to the embodiment of FIG. 2 the flushing valve spool 12 in FIG. 4 shows a negative overlap with the two inlet ports 5 and 6, thus allowing fluid flushing from both inlet ports 5 and 6 to the discharge port 7, when the flushing valve spool 12 is in its centred position.

FIG. 4 is a detailed view of the flushing valve spool 12 according to the invention and according to the embodiment of FIG. 2. In this FIG. 4, it is shown more detailed that in the centred position of the flushing valve spool 12 gaps 47 are present between the springs 14 and 15 and its corresponding spring contact surfaces 16 and 17 on the flushing valve spool 12. In FIG. 4, the springs 14 and 15 are fixed to the endcaps 40, 41, respectively to the spring support surfaces 20 and 21 on the end caps 40 and 41. In this situation, the flushing valve springs 14 and 15 are stationary with the end caps 40 and 41 and only the flushing valve spool 12 is in a floating equilibrium, which is already changed when a small pressure difference occurs between the inlet ports 5 and 6. At the moment when one of the pressures present at inlet port 5 or 6 is higher than the other one, the flushing valve spool 12 shifts towards its corresponding flushing valve spring 14 or 15. When the pressure difference is over the flushing valve spool 12 is high enough the flushing valve springs 14 or 15 will be compressed and ordinary loop flushing will start. A descriptive diagram for this is shown with FIG. 6.

For a person skilled in the art, it can be derived from FIG. 4 that with displacing the support surfaces 20, 21 at the endcaps 40, 41 the width of gaps 47 can be adjusted accordingly. By doing this, the amount of hydraulic fluid, which can be flushed at low pressure differences, can be adjusted accordingly. A person skilled in the relevant art also derives from the embodiment of FIG. 4 that the flushing valve springs 14 and 15, when fixed with one end to the end caps 40 and 41 can be inserted in the flushing valve bore in a prestressed manner, so that an ordinary loop flushing can start at a predetermined pressure difference over the flushing valve spool. Such a configuration for starting normal loop flushing is shown with FIG. 6, wherein the loop flushing flow increases with the characteristic of the used flushing valve springs 14 and 15, in this case linearly, starting with pressure difference of about 6.5 bar. At lower pressure differences only small loop flushing is enabled according to the gaps 47 between the contact surfaces 16 or 17 of flushing valve spool 12 the corresponding shoulders 24 or 25 in the flushing valve housing 8.

Figure 5:
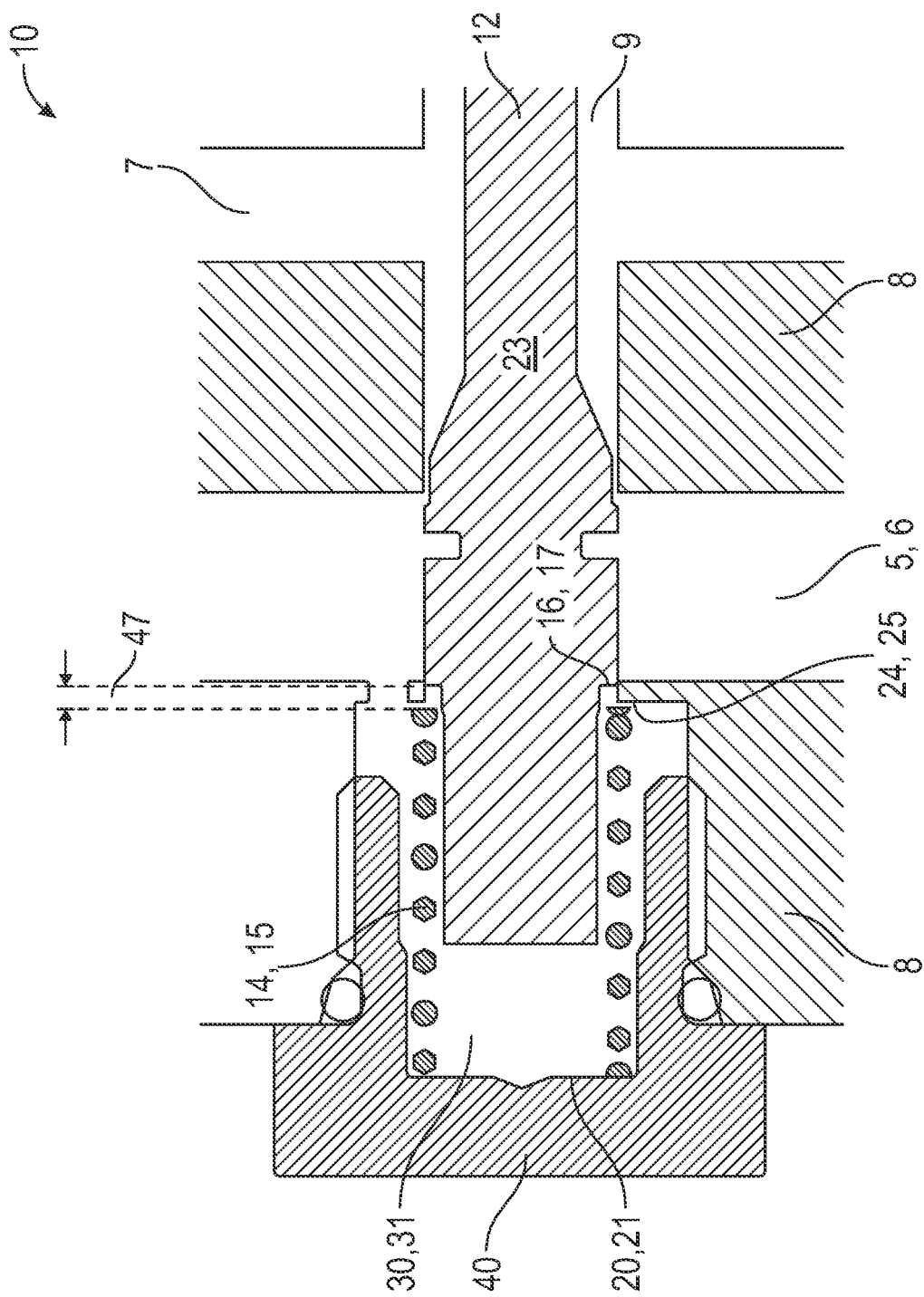
FIG. 5 a detailed view of an exemplary flushing valve according the invention.

With FIG. 5 a detailed view of one side of a flushing valve 10 according to the invention is shown. Even though due to illustration reasons only one side of the flushing valve 10 is shown reference numerals for both side are provided to indicate that these elements are arranged symmetrically in respect of the discharge port 7 on both sides of the flushing valve 10 according to the invention.

In the embodiment of FIG. 5 the flushing valve springs 14, 15 are mounted prestressed in the cylindrical valve bore 9 by means of the end caps 40, 41 providing the spring support surfaces 20, 21 towards the outside of flushing valve 10, wherein the other ends of flushing valve springs 14, 15 abut against shoulders 24, 25 in the cylindrical valve bore 9. In this embodiment gaps 47 are formed between the spring ends abutting against shoulders 24, 25 and spring contact surfaces 16, 17 on the flushing valve spool 12. A person with relevant skills in the art derives from this embodiment that the preload forces of flushing valve springs 14, 15 can be adjusted simply by screwing in or out the end caps 40, 41.

From FIG. 5 it can be seen also that flushing valve spool 12 shows in the centred position a negative overlap with the discharge port 7 enabling thereby a small hydraulic fluid flow from both inlet ports 5, 6 to discharge port 7. However, since a hydraulic unit in a closed circuit system is almost never in the neutral position there will be always a very little delta pressure acting on one of the front faces of the flushing valve spool 12 and shifting the flushing valve spool 12 out of the centred position. It can be seen from FIG. 5 that when the flushing valve spool 12 is moved towards one side the corresponding gap 47 is closed, even though the pressure force on the front face at the other side is not high enough to compress the flushing valve spring 14 or 15. However the flushing valve spool 12 closes in this gap 47 closing position the negative overlap (fluid path between flushing valve spool 12 and flushing valve bore 9) so that only hydraulic fluid flushing is enabled only on that side on which the gap 47 is present, which is the low pressure side.

The flushing valve spool shown in FIG. 5 comprises a mid-portion 23 of reduced diameter which is connected to the lateral portions of the flushing valve spool 12 in a tapered way in order to provide a proportional hydraulic fluid flushing of the flushing valve 10 once the pressure force on one front face of the flushing valve spool 12, i.e. the in one pressure in pressure chamber 30 or 31 is high enough to compress the opposite flushing valve spring 14 or 15.

Figure 6:
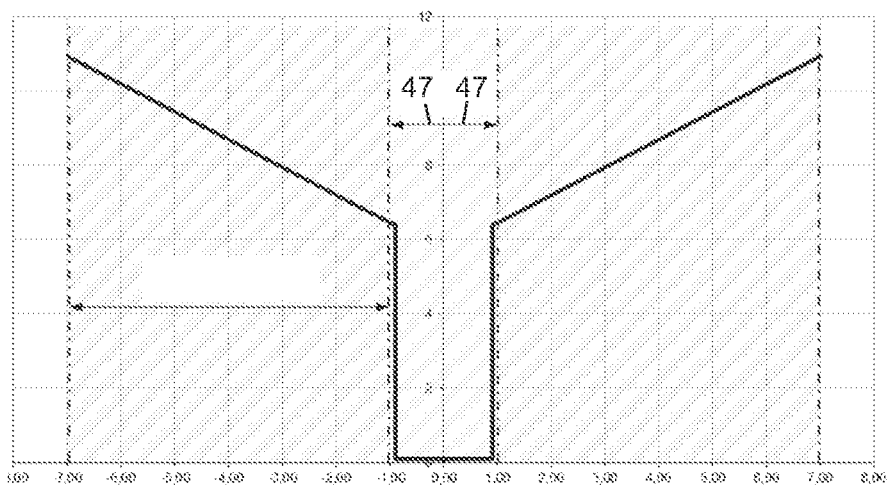
FIG. 6 a diagram for loop flushing according to the invention; In the following detailed description of preferred embodiments of the invention, same reference numbers are used for elements of different embodiments having the same functionality.

A functional diagram of the inventive flushing valve 10 is shown with FIG. 6 in which the gap size is selected exemplary to 0.9 mm and the spring compression pressure, i.e. the threshold value for hydraulic fluid flushing in operation conditions, is set to 6.5 bar. From the diagram of FIG. 6 it can be derived that the flushing valve spool 12 displacement is proportional to the pressure difference at the two inlet port 5 and 6. Together with the tapered flushing valve spool shown in FIG. 5 a proportional increasing hydraulic fluid flushing is achieved with increasing pressure difference at both inlet ports 5 and 6.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic fluid flushing valve for hydrostatic units usable in closed hydraulic circuit propel applications, having a flushing valve housing with a first inlet port connected to a first working line, a second inlet port connected to a second working line, and a discharge port for draining hydraulic fluid, wherein a two-sided flushing valve flushing valve spool which can be shifted is mounted within the flushing valve housing in a cylindrical valve bore, which, in a shifted position, enables a fluid flow from one of the first or the second inlet port at which the lower hydraulic pressure is present, to the discharge port, wherein the flushing valve spool comprises on each side a pressure surface each of which connected to one of the two inlet ports, wherein at each side of the flushing valve spool a flushing valve spring is located in the flushing valve housing in such a manner that, when the flushing valve spool is in its centre, non-shifted position, at each side of the flushing valve spool a distance between a spring contact surface on the flushing valve spool and a spring support surface in the flushing valve housing is greater than the axial length of the corresponding flushing valve spring, and wherein the flushing valve spool can be shifted out of its centre position free of spring forces until one of the flushing valve springs physically contacts both the corresponding spring contact surface on the flushing valve spool and the spring support surface in the flushing valve housing.

2. The hydraulic fluid flushing valve according to claim 1, wherein the cylindrical valve bore is closed by end caps, such that spaces between the ends of the flushing valve spool and the end caps form pressure chambers each of which can be supplied by one of the two inlet ports with hydraulic fluid under pressure and wherein each of the end caps provides the spring support surface for one of the flushing valve springs.

3. The hydraulic fluid flushing valve according to claim 2, wherein the flushing valve springs are attached to the end caps such that in the centre position of flushing valve spool a gap between each end of the flushing valve spool and correspondent flushing valve spring is present.

4. The hydraulic fluid flushing valve according to claim 3 wherein, when the pressure difference at the two inlet ports is greater than zero, the flushing valve spool is in a shifted position and contacts one of the flushing valve springs with its correspondent spring contact surface the flushing valve spring contacts the spring support surface and a fluid discharge from the inlet port at which the lower pressure is present, to the discharge port is enabled, wherein a fluid discharge from the other inlet port is disabled.

5. The hydraulic fluid flushing valve according to claim 2, wherein the flushing valve springs are housed prestressed in the flushing valve housing, wherein one side of each flushing valve spring abuts against a shoulder in the cylindrical valve bore and the other end abuts against the corresponding support surface of end cap.

6. The hydraulic fluid flushing valve according to claim 5, wherein the prestressing force of the flushing valve springs can be adjusted via the end caps.

7. The hydraulic fluid flushing valve according to claim 5 wherein, when the pressure difference at the two inlet ports is greater than zero, the flushing valve spool is in a shifted position and contacts one of the flushing valve springs with its correspondent spring contact surface the flushing valve spring contacts the spring support surface and a fluid discharge from the inlet port at which the lower pressure is present, to the discharge port is enabled, wherein a fluid discharge from the other inlet port is disabled.

8. The hydraulic fluid flushing valve according to claim 2, wherein the distances between the spring contact surfaces on the flushing valve spool and the spring support surfaces in the flushing valve housing or on the end caps can be adjusted.

9. The hydraulic fluid flushing valve according to claim 2, wherein the end caps are forming stroke limitations for the flushing valve spool.

10. The hydraulic fluid flushing valve according to claim 2 wherein, when the pressure difference at the two inlet ports is greater than zero, the flushing valve spool is in a shifted position and contacts one of the flushing valve springs with its correspondent spring contact surface the flushing valve spring contacts the spring support surface and a fluid discharge from the inlet port at which the lower pressure is present, to the discharge port is enabled, wherein a fluid discharge from the other inlet port is disabled.

11. The hydraulic fluid flushing valve according to claim 1 wherein, when the pressure difference at the two inlet ports is greater than zero, the flushing valve spool is in a shifted position and contacts one of the flushing valve springs with its correspondent spring contact surface, the flushing valve spring contacts the spring support surface and a fluid discharge from the inlet port at which the lower pressure is present, to the discharge port is enabled, wherein a fluid discharge from the other inlet port is disabled.

12. The hydraulic fluid flushing valve according to claim 1, wherein the flushing valve spool compresses one of the flushing valve springs, when the pressure difference at one of the two inlet ports is greater than a predetermined threshold value, and a fluid flow from the inlet port at which the lower pressure is present to the discharge port is enabled, wherein a fluid discharge from the other inlet port is disabled.

13. The hydraulic fluid flushing valve according to claim 12, wherein the flushing valve spool enables an amount of fluid discharge proportional to the pressure difference when the pressure difference is greater than the predetermined threshold value.

14. The hydraulic fluid flushing valve according to claim 1, wherein the flushing valve spool shows a general cylindrical shape, wherein a mid-portion shows a reduced diameter, which is fluidly connected to the discharge port and overlaps in a shifted position of the flushing valve spool with one of the two inlet ports.

15. The hydraulic fluid flushing valve according to claim 1, wherein the flushing valve spool shows in its centred position a positive or negative overlap with regard to both inlet ports.

16. A hydraulic propel unit with a hydraulic fluid flushing valve according to claim 1 wherein the discharge port leads into a housing or a tank of the hydraulic propel unit.

17. The hydraulic propel unit according to claim 16, wherein the flushing valve housing is an integral part of the housing of the hydraulic propel unit and wherein the valve bore of the flushing valve is formed in the housing of the hydraulic propel unit.

18. A hydraulic fluid flushing valve for hydrostatic units usable in closed hydraulic circuit propel applications, having a flushing valve housing with a first inlet port connected to a first working line, a second inlet port connected to a second working line, and a discharge port for draining hydraulic fluid, wherein a two-sided flushing valve flushing valve spool which can be shifted is mounted within the flushing valve housing in a cylindrical valve bore, which, in a shifted position, enables a fluid flow from one of the first or the second inlet port at which the lower hydraulic pressure is present, to the discharge port, wherein the flushing valve spool comprises on each side a pressure surface each of which connected to one of the two inlet ports, wherein at each side of the flushing valve spool a flushing valve spring is located in the flushing valve housing in such a manner that, when the flushing valve spool is in its centre, non-shifted position, at each side of the flushing valve spool a distance between a spring contact surface on the flushing valve spool and a spring support surface in the flushing valve housing is greater than the axial length of the corresponding flushing valve spring, wherein the cylindrical valve bore is closed by end caps, such that spaces between the ends of the flushing valve spool and the end caps form pressure chambers each of which can be supplied by one of the two inlet ports with hydraulic fluid under pressure and wherein each of the end caps provides the spring support surface for one of the flushing valve springs, and wherein the flushing valve springs are attached to the end caps such that in the centre position of flushing valve spool a gap between each end of the flushing valve spool and correspondent flushing valve spring is present.

19. A hydraulic fluid flushing valve for hydrostatic units usable in closed hydraulic circuit propel applications, having a flushing valve housing with a first inlet port connected to a first working line, a second inlet port connected to a second working line, and a discharge port for draining hydraulic fluid, wherein a two-sided flushing valve flushing valve spool which can be shifted is mounted within the flushing valve housing in a cylindrical valve bore, which, in a shifted position, enables a fluid flow from one of the first or the second inlet port at which the lower hydraulic pressure is present, to the discharge port, wherein the flushing valve spool comprises on each side a pressure surface each of which connected to one of the two inlet ports, wherein at each side of the flushing valve spool a flushing valve spring is located in the flushing valve housing in such a manner that, when the flushing valve spool is in its centre, non-shifted position, at each side of the flushing valve spool a distance between a spring contact surface on the flushing valve spool and a spring support surface in the flushing valve housing is greater than the axial length of the corresponding flushing valve spring, wherein the cylindrical valve bore is closed by end caps, such that spaces between the ends of the flushing valve spool and the end caps form pressure chambers each of which can be supplied by one of the two inlet ports with hydraulic fluid under pressure and wherein each of the end caps provides the spring support surface for one of the flushing valve springs, and wherein the flushing valve springs are housed prestressed in the flushing valve housing, wherein one side of each flushing valve spring abuts against a shoulder in the cylindrical valve bore and the other end abuts against the corresponding support surface of end cap.

20. The hydraulic fluid flushing valve according to claim 19, wherein the prestressing force of the flushing valve springs can be adjusted via the end caps.

\* \* \* \* \*